United States Patent [19]

Strassel

[11] 4,071,390
[45] Jan. 31, 1978

[54] METHOD OF COATING FLEXIBLE SUBSTRATES WITH POLYURETHANE-POLYUREA ELASTOMERS AND PRODUCTS PRODUCED THEREBY

[75] Inventor: Albert Strassel, Oullins, France

[73] Assignee: Produits Chimiques Ugine Kuhlmann, Paris, France

[21] Appl. No.: 592,168

[22] Filed: July 1, 1975

[30] Foreign Application Priority Data

July 5, 1974 France .................................. 74.23417

[51] Int. Cl.$^2$ ............................................. B32B 31/00
[52] U.S. Cl. .................................... 156/239; 156/243; 156/246; 156/247; 428/315; 428/425
[58] Field of Search .............. 260/77.5 CH, 77.5 AM, 260/245, 246; 427/412, 407; 156/230, 231, 239, 247, 243, 246; 428/425, 424, 423, 904, 315

[56] References Cited

U.S. PATENT DOCUMENTS

| | | | |
|---|---|---|---|
| 3,456,037 | 7/1969 | Hoeschele | 260/858 |
| 3,475,266 | 10/1969 | Strassel | 264/255 |
| 3,499,858 | 3/1970 | Strassel | 260/77.5 AM |
| 3,619,257 | 11/1971 | Fukada et al. | 427/246 |
| 3,650,880 | 3/1972 | Tieniber | 428/425 |
| 3,794,548 | 2/1974 | Wirth et al. | 428/311 |
| 3,912,680 | 10/1975 | Oertel et al. | 156/230 |

Primary Examiner—William J. Van Balen
Attorney, Agent, or Firm—Pennie & Edmonds

[57] ABSTRACT

Process for coating flexible substrates which comprises applying a finishing polyurethane-polyurea elastomer coating to a release surface, applying an undercoat of a polyurethane-polyurea elastomer having a different composition than the finishing coating on the finishing coating and applying a flexible substrate to the undercoating.

The polyurethane-polyurea elastomers used as the finishing coat are prepared by forming a polyether-polyol prepolymer in which the polyol consists essentially of a diol or a mixture of diols and which prepolymer is subsequently reacted with an aromatic diamine.

The polyurethane-polyurea elastomers used to form the undercoat are obtained by reacting the aromatic diamine with a polyether-polyol prepolymer in which the polyol consists essentially of one having an hydroxyl functionality of at least 3 or a mixture of polyols in which at least one of the polyols has a hydroxy functionality greater than 2 in a sufficient amount to increase the resistance to flexing.

The coated flexible substrates are useful in many areas as is known for polyurethane or polyurea coated substrates generally, but the coated flexible substrates, according to this invention, are particularly useful in the manufacture of shoe uppers.

9 Claims, No Drawings

METHOD OF COATING FLEXIBLE SUBSTRATES WITH POLYURETHANE-POLYUREA ELASTOMERS AND PRODUCTS PRODUCED THEREBY

BACKGROUND OF THE INVENTION

When it is desired to coat a leather, a woven or nonwoven fabric, or any other flexible material, with a film of polyurethane-polyurea, it is difficult to obtain a product which has both satisfactory resistance to repeated flexing and at the same time satisfactory resistance to abrasion, because these two important characteristics are generally antagonistic.

Another property which often also plays a very important role in the manufacture of polyurethane-polyurea flexible assemblies is scratch resistance. This is particularly the case in the shoe industry. However, the same factors which increase flex resistance are often found to diminish the scratch resistance.

It is known that polyurethane-polyurea elastomers generally possess a high resistance to abrasion when the ratio of urea to urethane is high. The same is true for resistance to scratching. These generalizations are only true, however, when the average molecule weight of the polyol of mixture of polyols is about equal. Unfortunately, the more the urea/urethane ratio is increased (still at constant level of mean molecular weight of polyol or polyols) the more the rigidity of the elastomer is increased and therefore the more the flex-resistance diminishes.

Another property which is very difficult to evaluate, but which is of extreme importance for all coatings on flexible substrates is the "feel" or "hand" which likewise depends to a high degree on the urea/urethane ratio. The choice of compositions has consequently always been a matter of compromise.

It is also well known that polyester groupings (with the exception of those derived from E-caprolactone) are deleterious to resistance to aging in humid atmospheres. The use of a prepolymer having simultaneously polyether groupings and polyester groupings achieves results superior to those obtained with polyesters alone, but the resistance to aging in humid atmospheres is always superior when polyol polyethers are used alone.

SUMMARY OF THE INVENTION

The present invention provides a method which achieves coatings and films having all of the qualities which have been considered until now to be antagonistic to each other, namely having significantly increased values of resistance to repeated flexing, resistance to abrasion, resistance to scratching and resistance to aging in humid atmosphere. The invention further includes the flexible polyurethane-polyurea products or assemblies so produced.

This invention relates to a method of coating flexible substrates by applying or spraying polyurethane-polyurea elastomers onto a release surface as a finishing coat and applying thereover an undercoat of polyurethane-polyurea elastomers having a different composition. The polyurethane-polyurea elastomers of the finishing coat are prepared by using a prepolymer comprising a polyether-polyol in which the polyol consists essentially of a diol or a mixture of diols, and the polyurethane-polyurea elastomers of the undercoat are prepared by using a prepolymer consisting essentially of at least a trifunctional polyol or a mixture of polyols of which at least one polyol has a functionality greater than 2.

The invention also includes the coating obtained by such a process and the corresponding articles which are fabricated by applying the flexible substrate to the freshly sprayed undercoat by any known means.

DETAILED DESCRIPTION OF THE INVENTION

The polyether polyurethane-polyurea compositions which are suitable in making the first coat or finishing coat of this invention are those described in French Pat. No. 1,427,722. Such compositions are obtained by reacting a polyether polyurethane prepolymer (prepared preliminarily by reaction of polyetherpolyols and excess polyisocyanate in such a manner that the molar ratio of NCO/OH is between about 1.5 and 3.0 and advantageously at least equal to 2) with an aromatic diamine in a solvent solution, the proportions of polyether-polyurethane prepolymer to the diamine corresponding to a $NH_2/OH$ ratio higher than 0.5 (preferably between 0.5 and 2) and the ratio $NCO/(OH + NH_2)$ is between about 0.95 and 1.6. The said compositions can be applied most advantageously by spraying to form a film or coating whose thickness can range from several tenths of a millimeter to several centimeters.

The compositions of the polyurethane-polyurea suitable for making the second coat or undercoat are obtained by reacting (1) an aromatic diamine in solvent solution and (2) a prepolymer or a mixture of prepolymers prepared from a polyol and containing a hydroxy functionality of at least 3 or a mixture of polyols of which at least one has a functionality greater than 2 in sufficient amount to impart improved flex resistance to the assembly with an excess of polyisocyanate.

The average molecular weight of the polyols, including the oxypropylated and/or oxyethylated polyols which can be used in either the first or second coat is advantageously between about 400 and 7000. The average molecular weight of the polytetramethylene glycols used in the first coat is advantageously about between 700 and 4000, preferably between 1000 and 3000.

Various polyisocyanates or diisocyanates can be used including aromatic aliphatic or cycloalaphatic polyisocyanates, as is known to the man skilled in the art. Preferably the commercially available polyisocyanates such as toluene diisocyanate, diphenylmethane diisocyanate, hexamethylene diisocyanate and isophorone diisocyanate are employed.

Various aromatic diamines can be used according to the invention including benzidine, dichlorobenzidine, diaminodichlorodiphenylmethane, methylene dianiline, metaphenylene diamine and the like, either singly or in mixture. Suitable solvents for dissolution of the diamine include the ketones, esters, chlorinated hydrocarbons and the like, or their mixtures.

As previously discussed, the prepolymers as well as the reactions between the prepolymers and the amines can be carried out by well-known means. The prepolymers as well as the polyurethane-polyurea elastomers can be prepared as disclosed in the literature, for example, MANUFACTURE OF PLASTICS, Volume 1, published by Reinhold Publishing Corporation (1964), Chapter 12, pages 456–491, and THE ENCYCLOPEDIA OF POLYMER SCIENCE AND TECHNOLOGY, Volume 11, published by John Wiley and Sons, Inc. (1969), pages 464–563.

The above cited references also are used to supplement this disclosure with respect to the polyols, that is, the diols and those containing more than two hydroxyl functions, the oxypropylated or oxyethylated polyols, the diisocyanates which can be used to form the prepolymers as well as the aromatic diamines already disclosed in this application.

With respect to the first or finishing coat that is applied to a release matrix whose contours are to be reproduced, it has been found advantageous to produce this coating by reacting the aromatic diamines in a solvent solution with either a prepolymer prepared from a mixture of two polyether diols, one being the polyoxypropylene glycol and/or a polyoxethylene glycol, and the other being a polytetramethylene glycol with an excess of diisocyanate, as described herein, or a mixture of two polymers, one being prepared from a polyoxypropylene and/or a polyoxyethylene glycol with an excess of diisocyanate, and the other being prepared from a polytetramethylene glycol with an excess of diisocyanate.

With respect to the undercoat, it is advantageous to form the coating composition by reacting the aromatic diamine in a solvent with a prepolymer or a mixture of prepolymers prepared by reacting with the aromatic diamine a polyol having at least a trifunctional hydroxy content or a mixture of polyols derived from ethylene oxide or propylene oxide which contains at least one polyol having a hydroxyl functionality of at least three, present in sufficient amount to increase the flex resistance of the ultimate assembly or product, with an excess of a diisocyanate.

Mixtures of polyols can be used for preparing the prepolymers for the undercoat so long as a sufficient amount of a tri or greater hydroxy functional polyol is used to give the desired flex resistance to the assembly. In such a case the hydroxy functionality will average greater than 2, for example, 2.5 rather than 3 when only a trifunctional polyol is used. When using mixed diols and triols it is advantageous to use a mixture so that the polyol mixture contains at least about 20% by weight of a polyol containing 3 or more hydroxy functions. Polyols having a hydroxy function greater than 3 can be used so long as the rigidity of the coating is not too great as to interfere with the flexibility.

The proportions of the prepolymer and diamine used together in the undercoat can be the same as those in the finishing coat, namely an $NH_2/OH$ ratio higher than 0.5 (preferably between about 0.5 and 2) and having a mol ratio of $NCO/(OH + NH_2)$ between about 0.95 and 1.6. The prepolymer for the undercoat can similarly be prepared using quantities of polyisocyanate and polyether polyols so that the NCO/OH ratio is greater than about 1.5, preferably between about 1.5 and 3. The most advantageous ratio is about 2.

The preopolymers for both the finishing coat and undercoat can be prepared by heating the reactant preferably to a temperature of between about 50° and 150° C over a period of between about 1 to 5 hours under an inert gas atmosphere.

The viscosity of prepolymers is generally too high for use in a spray gun and it is therefore generally necessary to lower it by heating (between about 50° and 120° C) or by dilution in an anhydrous solvent such as a ketone, as ester, a chlorinated hydrocarbon, an aromatic hydrocarbon or in a mixture of any of these solvents.

The dissolution can be carried out in the cold or with heating, under agitation. The solution is stable on storage. If it is desired to minimize the quantity of solvent, crystallization of the diamine is avoided by heating the supply chambers of the spray gun to 50° to 100° C.

Pigments and colorants, if preferred, can be added directly to the diamine solution or in the form of a paste in a plasticizer or solvent. But if they are inert and anhydrous, they can be mixed with the prepolymer or even partly in the prepolymer, partly in the diamine solution.

As examples of flexible substrates there can be mentioned leathers, synthetic leathers, fabrics and cloth of any kind, non-woven fabrics, sheets of flexible foam, flexible plastic materials, paper and the like.

The prepolymer and diamine solution are rapidly mixed just before application, preferably with the air of a spray gun equipped with either internal or external mixing system; the two constituents can, for example, be supplied to the gun with the aid of proportioning pumps.

Gelation of the mixtures starts as soon as they have been sprayed on the substrate or matrix. Due to the reactivity of its constituents, reaction takes place satisfactorily at a temperature as low as 20° C or as high as 120° C without a catalyst.

In carrying out the method of this invention, it is advantageous to have a dual system of pumping and spraying and preferably a dual system of stoving.

In order to assure good cohesion between the two coats or layers, the spraying of the second coat or undercoat is carried out before complete drying of the first. The optimum time between the two sprayings will vary according to the reactivity of the first coat and can be reduced by heating the matrix to about 120° C before spraying the first coat. Immediately after spraying the second coat, the flexible substrate is applied by any suitable procedure in a manner such as to assure a good bond between substrate and elastomer.

After the second spraying, the assembled article is stripped from the matrix as soon as cohesion between substrate and elastomer permits. The time required for the stripping can be decreased by operating while the assembly is at a temperature up to 120° C.

Tests which have been made on the new products show that the combination of two coats gives rise to a combination of qualities which are not obtainable by using either of the two coating compositions alone, whether they are applied in one or two coats.

In addition to the advantages already given, it must be appreciated that in industrial practice one can regulate separately the respective rates at which the finishing coat and undercoat are cured. This is either impossible, or at least very difficult, to achieve with a single composition. It is consequently easy to choose the finishing coat composition such that it will dry in several seconds, thus permitting a quick application of the undercoat, for which one can choose a longer drying time making for a more perfect molding and later a perfect bond to the flexible support.

Another important advantage is that, at the time of attaching the substrate, the first coat already possesses rigidity sufficient to prevent any deformation which might otherwise be caused by the pressure of applying the substrate. This results in a more perfect reproduction of the matrix surface.

This invention will be further illustrated by description in connection with the following specific examples wherein, as also elsewhere herein, proportions are by weight unless otherwise stated.

EXAMPLE I a. Preparation of prepolymer for finishing or top coat.
Prepolymer A Over the course of 1 hour under a reduced pressure of 10mm of mercury, a mixture of 1600 grams of polytetramethylene glycol having an average molecular weight 2000 and 400 grams of a polyoxypropylene glycol having average molecular weight 2000 are dehydrated, 348 grams of toluene diisocyante in the molar ratio of isocyanate function to hydroxyl function NCO-/OH = 2 are reacted with the mixture by heating the mixture for 3 hours at 90° C, a prepolymer is obtained shown by analysis to have 0.82 mols of NCO per kilogram.

b. Preparation of prepolymer for the undercoat.
Prepolymer B

Using the same conditions as in preparing Prepolymer A, a prepolymer is prepared from 4000 grams of a triol obtained by oxypropylation of trimethylolpropane and having a molecular weight 4000, obtained by known and conventional procedure, and 522 grams of toluene diisocyanate corresponding to molar ratio NCO/OH = 2. After heating for three hours at 90° C, the prepolymer had 0.62 mols of NCO per kilogram.

c. Spraying was carried out with the air of a spray gun charged with a mixture of 100 parts by weight of Prepolymer A in 70% solution with anhydrous methylethylketone and 16 parts by weight of methylene dianiline in 40% solution in methylethylketone.

A siliconized grained paper (patterned to simulate leather) was sprayed in this manner. The treated siliconized paper was immediately conveyed into an oven regulated at 90° C where it was left for 1 minute. On its removal from the oven, the coating which measured 15/100 mm in thickness, was still tacky. This was the finishing or top coat.

d. Immediately thereafter, the undercoat was sprayed on top of the tacky top coat. The spray gun, which was of the same type as used for the finishing coat, was charged with 100 parts by weight of prepolymer B in the form of an 80% solution in methylethylketone and 13 parts by weight of methylene dianilin in the form of a 40% solution in methylethylketone.

Several seconds after this second spraying, the assembly was completed by laying on the still wet surface pieces respectively of leather, of woven fabric and of unwoven fabric. The assembly was submitted to a 5 minute passage through an oven regulated at 80° C. The siliconized paper was then removed, presenting a top coat which had the desired grained appearance and an agreeable "feel" or "hand."

In the BALLY test on pendulum flexometer as used in the shoe industry to evaluate flex strength of leathers or simulated leathers, assemblies prepared in the above manner did not develop any surface cracking after 300,000 flexes, which is deemed extremely satisfactory. The resistances to abrasion and scratching are also very good and leather or non-woven fabric coated in the manner described are thus particularly useful in the shoe industry.

The unsupported undercoating film has the following mechanical properties:

| | |
|---|---|
| Load at rupture | 60 kg/cm² |
| Elongation at break | 250% |
| Tear resistance | 25 kg/cm |
| Elastic recovery in 3 minutes | 100% |

EXAMPLE II

This example does not illustrate the instant invention but shows by way of comparison the advantage of the double-layered combination of this invention with reference to the known procedure which uses the same elastomer in preparing both finishing coat and undercoat.

A prepolymer was prepared from two difunctional polyols of about 2000 molecular weight, one of which was a polyoxypropylene glycol designated by the mark P2010, and the other a polytetramethylene glycol having a molecular weight of about 2000 designated by the mark PTM 2000.

1500 grams of P2010 and 450 grams of PTM 2000 were dehydrated for 1 hour at 120° C under 3 mm of mercury after cooling down to 40° C. 348 grams of toluene diisocyanate were then added rapidly and the mixture was brought to 80° C with agitation under a blanket of nitrogen. This temperature was maintained over a period of 3 hours.

The difunctional prepolymer obtained in this way had, after 48 hours, 0.85 mols of isocyanate (NCO) functionality per kilogram.

An assembly or laminate was then prepared as in Example I by mixing 120 parts by weight of the above prepolymer with methylethylketone to form an 80% solution in a spray gun with the aid of an internal mixer.

After spraying sufficient of this mixture on a siliconized paper to effect a layer of 15/100 mm thickness and passage through an oven for 4 min. at 80° C, a second application of the same composition was immediately sprayed in sufficient amount to effect a second layer of the same thickness, and a leather substrate was superimposed over the undercoat.

After a second passage through the oven for 4 min. at 80° C, the assembly was removed from the paper having the silicone release agent and found to have good initial adhesion among the respective layers. However, in the BALLY flexometer test, cracks appeared in the elastomer coating after about 10,000 flexes. Leather thus coated by polyurethane is unsuitable for use in the shoe industry.

EXAMPLE III

1. Prepolymers for Finishing Coat

The two prepolymers C and D are prepared separately using the method of Example I:

Prepolymer C is obtained from 2000 grams of a polyoxypropylene glycol of molecular weight 2000 and 348 grams of toluene diisocyanate, corresponding to a molar ratio NCO/OH = 2.

Prepolymer D is obtained from 2000 grams of polytetramethylene glycol (mol estimated about 2000) designated as PTM 2000 and 348 grams of toluene diisocyanate.

48 hours after the heated reaction, the two prepolymers are shown by analysis to have respectively 0.08 and 0.82 mols of NCO function per kilogram. These two prepolymers are mixed in the proportion by weight C/D = 20/80. The mixture is identified as prepolymer E.

2. Prepolymer for Undercoat

A prepolymer F is prepared by mixing 6000 grams of a triol obtained by oxypropylation and oxyethylation (in approximately equal parts) of trimethylolpropane by known and conventional procedure, said triol having a molecular weight about 6000, and 522 grams of toluene diisocyanate. This mixture is brought to 70° C with agitation and maintained at that temperature for 2 hours. This prepolymer has 0.42 mols NCO per kilogram.

3. Spraying

Prepolymers E and F were successively sprayed in the manner described in Example I. Prepolymers E were applied in an 80% solution of anhydrous methylethylketone in admixture with a 20% solution of methylene dianiline in ethyl acetate; and prepolymer F was applied in 80% solution in ethyl acetate admixed with the same 20% methylene dianiline solution. The weight ratio of the prepolymers and diamines was the same as in Example I.

For the two coatings the overall molar ratio of NCO to (OH + NH$_2$) was 0.95. The first coat had a thickness of 12/100 mm and the second was 20/100 mm.

Between the two sprayings, the assembly was passed through an oven at 60° C for 2 min. Immediately after the second spraying a non-woven substrate was superimposed on the tacky sprayed surface. The completed assembly was stoved for 5 minutes at 60° C before stripping from the release paper layer. The finished article had a good resistance to scratching and to abrasion and resisted more than 250,000 flexes on the BALLY flexometer without cracking.

I claim:

1. A method of forming a polyurethane-polyurea coating having good resistance to repeated flexing, abrasion, scratching and aging which comprises applying to a release surface a top finishing coat comprising the reaction product of an aromatic diamine with a prepolymer prepared by reacting an excess of a polyisocyanate with a polyol consisting essentially of a diol or mixture of diols; at least partially curing said finishing coat; applying on said finishing coat an undercoat comprising the reaction product of an aromatic diamine with a prepolymer prepared by reacting an excess of a polyisocyanate with a polyol consisting essentially of a polyol having a hydroxy functionality of at least 3 or a mixture of polyols having an average hydroxy functionality greater than 2 and sufficiently high to substantially increase the flex resistance of the total assembly to the top finishing coat; applying a flexible substrate to the undercoat, and curing the entire assembly including the undercoat to bond the top finishing coat, the undercoat and the flexible substrate together.

2. The method of claim 1 in which the prepolymer of the top finishing coat contains an NCO/OH ratio between about 1.5 and 3 and in which the polyurethane-polyurea product of the top finishing coating contains a NH$_2$/OH ratio greater than 0.5 and an NCO/(OH + NH$_2$) ratio between about 0.95 and 1.6.

3. The method of claim 2 in which the NCO/OH ratio is at least 2 and the NH$_2$/OH ratio is between about 0.5 and 2.

4. Method of claim 1 in which the top finishing coat is prepared by (a) reaction of an aromatic diamine in a solvent with a prepolymer formed from a mixture of two polyols, one of which is a polyoxypropylene glycol and/or a polyoxyethylene glycol and the other a polytetramethylene glycol with an excess of a diisocyanate, or (b) reaction of two prepolymers one of which is prepared by reacting a polyoxypropylene glycol and/or a polyoxyethylene glycol with an excess of a dissocyanate, and the other being prepared by reacting a polytetramethylene glycol with an excess of a diisocyanate and in which the undercoat is prepared by the reaction of an aromatic amine in a solvent solution with a prepolymer prepared by reacting an excess of a dissocyanate with a polyol consisting essentially of a polyol having an hydroxy functionality of at least 3 or a mixture of polyols having an average hydroxy functionality greater than 2 and sufficiently high to substantially increase the flex resistance of the total assembly.

5. The method of claim 4 in which the polyols are oxypropylated or oxyethylated polyols having a molecular weight between about 400 and 7000 and in which the polytetramethylene glycol used in the finishing coat has average molecular weight between 700 and 4000.

6. The method of claim 5 in which the dissocyanate is toluene diisocyanate, diphenylmethane diisocyanate, hexamethylene diisocyanate or isophorone diisocyanate.

7. The method of claim 5 in which the aromatic diamine is benzidine, dichlorobenzidine, diiaminodichlorodiphenylmethane, methylene diamine or metaphenylene diamine, or mixtures thereof.

8. The method of claim 5 in which the diamine is in a solution of a ketone, an ester, a chlorinated hydrocarbon or mixtures thereof.

9. The method of claim 5 in which the prepolymers contain an NCO/OH ratio in excess of 1.5 and are prepared by heating the polyols and polyisocyanate to a temperature between 50° and 150° C over a period of 1 to 5 hours under inert gas atmosphere.

* * * * *

UNITED STATES PATENT AND TRADEMARK OFFICE
CERTIFICATE OF CORRECTION

PATENT NO. : 4,071,390
DATED : January 31, 1978
INVENTOR(S) : Albert Strassel

It is certified that error appears in the above–identified patent and that said Letters Patent are hereby corrected as shown below:

Column 3, lines 63 and 64, reads "as ester" should read --an ester--

Column 6, line 63, reads "0.08" should read --0.80--

Signed and Sealed this

*Twentieth* Day of *June 1978*

[SEAL]

Attest:

RUTH C. MASON
*Attesting Officer*

DONALD W. BANNER
*Commissioner of Patents and Trademarks*